(12) United States Patent
Zhang et al.

(10) Patent No.: US 12,124,688 B2
(45) Date of Patent: Oct. 22, 2024

(54) PAGE DISPLAY SWITCHING METHOD, APPARATUS, STORAGE MEDIUM, AND ELECTRONIC DEVICE

(71) Applicant: BEIJING YOUZHUJU NETWORK TECHNOLOGY CO. LTD., Beijing (CN)

(72) Inventors: Bo Zhang, Beijing (CN); Zhiyuan Hu, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 18/323,011

(22) Filed: May 24, 2023

(65) Prior Publication Data

US 2023/0297222 A1 Sep. 21, 2023

Related U.S. Application Data

(63) Continuation of application No. PCT/CN2021/133053, filed on Nov. 25, 2021.

(30) Foreign Application Priority Data

Nov. 25, 2020 (CN) .......................... 202011345787.7

(51) Int. Cl.
  *G06F 3/0481* (2022.01)
  *G06F 3/04845* (2022.01)
(52) U.S. Cl.
  CPC ........ *G06F 3/04845* (2013.01); *G06F 3/0481* (2013.01); *G06F 2203/04803* (2013.01); *G06F 2203/04804* (2013.01)
(58) Field of Classification Search
  None
  See application file for complete search history.

(56) References Cited

U.S. PATENT DOCUMENTS

2007/0192732 A1  8/2007  Nitta et al.
2014/0075290 A1  3/2014  Zhen et al.
(Continued)

FOREIGN PATENT DOCUMENTS

CN       101021859 A       8/2007
CN       104978119 A       10/2015
(Continued)

OTHER PUBLICATIONS

China National Intellectual Property Administration, International Search Report Issued in Application No. PCT/CN2021/133053, Feb. 22, 2022, WIPO, 6 pages.

(Continued)

*Primary Examiner* — Rinna Yi
(74) *Attorney, Agent, or Firm* — Alleman Hall & Tuttle LLP

(57) ABSTRACT

The present disclosure relates to a page display switching method, apparatus, storage medium, and electronic device. The page display switching method includes: in response to a display switching operation for a first display window, performing control to change the height and width of the first display window to switch the first display window to a second display window; determining a target display content to be displayed in the second display window, which includes a first display content corresponding to the first display window and a second display content corresponding to the second display window, wherein the second display content is a content that is acquired synchronously with the first display content and hidden during display of the first display window; performing control to display the target display content in the second display window.

15 Claims, 4 Drawing Sheets

(56) References Cited

U.S. PATENT DOCUMENTS

| | | | |
|---|---|---|---|
| 2015/0089414 A1 | 3/2015 | Park | |
| 2015/0261834 A1 | 9/2015 | Shi | |
| 2017/0308509 A1* | 10/2017 | Son | H04N 21/472 |
| 2018/0130097 A1* | 5/2018 | Tran | G06F 3/0485 |
| 2022/0114330 A1* | 4/2022 | McClendon | G11B 27/005 |
| 2022/0207570 A1* | 6/2022 | Kimura | G06Q 30/0277 |

FOREIGN PATENT DOCUMENTS

| | | |
|---|---|---|
| CN | 105278797 A | 1/2016 |
| CN | 107943552 A | 4/2018 |
| CN | 104156404 B | 11/2018 |
| CN | 108875079 A | 11/2018 |
| CN | 109710348 A | 5/2019 |
| CN | 110825997 A | 2/2020 |
| CN | 111274513 A | 6/2020 |
| CN | 112486611 A | 3/2021 |
| JP | 2016031667 A | 3/2016 |
| JP | 2020043553 A | 3/2020 |

OTHER PUBLICATIONS

China National Intellectual Property Administration, Office Action and Search Report Issued in Application No. 202011345787.7, May 16, 2022, 19 pages.
China National Intellectual Property Administration, Office Action and Search Report Issued in Application No. 202011345787.7, Aug. 31, 2022, 16 pages.
China National Intellectual Property Administration, Notice of Allowance Issued in Application No. 202011345787.7, Dec. 2, 2022, 3 pages.
Japan Patent Office, Office Action Issued in Application No. 2023-531525, Jun. 25, 2024, 5 pages.

* cited by examiner

PAGE DISPLAY SWITCHING METHOD, APPARATUS, STORAGE MEDIUM, AND ELECTRONIC DEVICE

CROSS-REFERENCE TO RELATED APPLICATION

The present disclosure is a continuation of PCT/CN2021/133053 filed Nov. 25, 2021, which claims priority of Chinese application for invention No. 202011345787.7, filed on Nov. 25, 2020 and entitled "PAGE DISPLAY SWITCHING METHOD, APPARATUS, STORAGE MEDIUM, AND ELECTRONIC DEVICE", the disclosure of which is hereby incorporated into this disclosure in its entirety.

TECHNICAL FIELD

The present disclosure relates to the technical field of computer technology, in particular to a page display switching method, apparatus, storage medium, and electronic device.

BACKGROUND

With the continuous development of computer technology, the content display method in terminal devices includes displaying in the form of a card and a landing page. For example, for online advertisements, when users browse contents with terminal devices, advertisements in the form of a card can be pushed to the users according to their browsed contents. If further understanding of the content corresponding to an advertisement in the form of a card is desired, a user can click on the advertisement in the form of a card, which will then jump to an advertisement in the form of a landing page.

SUMMARY

This summary is provided for a concise introduction of the inventive concept of the present application, which will be described in detail in the Detailed Description below. This summary is not intended to identify critical features or essential features of the claimed technical solution, nor is it intended to be used to limit the scope of the claimed technical solution.

In a first aspect, the present disclosure provides a page display switching method, comprising:
  in response to a display switching operation for a first display window, performing control to change the height and width of the first display window to switch the first display window to a second display window;
  determining a target display content to be displayed in the second display window, the target display content including a first display content corresponding to the first display window and a second display content corresponding to the second display window, wherein the second display content is a content that is acquired synchronously with the first display content and hidden during display of the first display window;
  performing control to display the target display content in the second display window.

In a second aspect, the present disclosure provides a page display switching apparatus, comprising:
  a switch control module for, in response to a display switching operation for a first display window, performing control to change the height and width of the first display window to switch the first display window to a second display window;
  a content determination module for determining a target display content to be displayed in the second display window, the target display content including a first display content corresponding to the first display window and a second display content corresponding to the second display window, wherein the second display content is a content that is acquired synchronously with the first display content and hidden during display of the first display window;
  a display control module for performing control to display the target display content in the second display window.

In a third aspect, the present disclosure provides a computer-readable storage medium having stored thereon a computer program that, when executed by a processing device, implement one or more steps of the method described in the first aspect.

In a fourth aspect, the present disclosure provides an electronic device, comprising:
  a storage apparatus having stored thereon a computer program;
  a processing apparatus for executing the computer program in the storage apparatus to implement one or more steps of the method described in the first aspect.

In a fifth aspect, the present disclosure provides a computer program, comprising: instructions that, when executed by a processor, cause the processor to perform one or more steps of the page display switching method described in the first aspect.

In a sixth aspect, the present disclosure provides a computer program product including instructions that, when executed by a processor, cause the processor to perform one or more steps of the page display switching method described in the first aspect.

Other features and advantages of this disclosure will be explained in detail in the Detailed Description that follows.

BRIEF DESCRIPTION OF THE DRAWINGS

The above and other features, advantages, and aspects of the embodiments of the present disclosure will become more apparent from the Detailed Description below with reference to the drawings. Throughout the drawings, the same or similar reference signs indicate the same or similar elements. It should be understood that the drawings are illustrative, and the components and elements are not necessarily drawn to scale. In the drawings.

DETAILED DESCRIPTION

Figure 1:
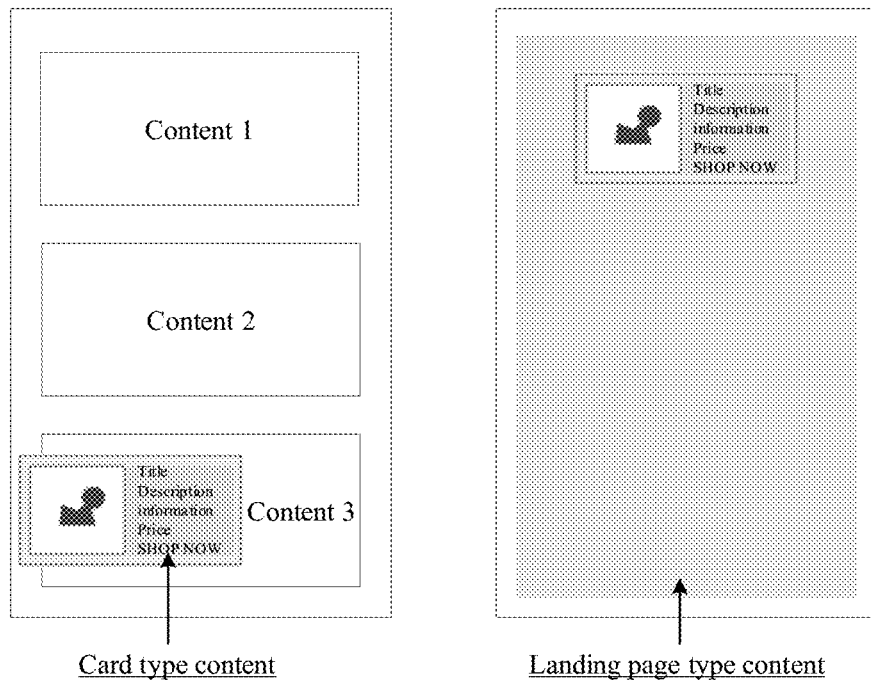
FIG. 1 is a schematic diagram of a card type content and a landing page type content.

Embodiments of the present disclosure will now be described in more detail below with reference to the accompanying drawings. Although certain embodiments of the present disclosure are illustrated in the drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only for exemplary purposes, and are not used to limit the scope of protection of the present disclosure.

It should be understood that the various steps described in the method embodiments of the present disclosure may be executed in a different order, and/or executed in parallel. In addition, the method embodiments may include additional steps and/or some of the illustrated steps may be omitted. The scope of this disclosure is not limited in this regard.

The term "including" and its variants as used herein is an open-ended mode expression, that is, "including but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first", "second" and the like mentioned in the present disclosure are only used to distinguish different devices, modules or units, and are not used to limit the order of functions performed by these devices, modules or units, or interdependence therebetween. It should be noted that the modifications of "a" and "a plurality of" mentioned in the present disclosure are illustrative and not restrictive, and those skilled in the art should understand that they should be understood as "one or more", unless otherwise clearly indicated in the context.

The names of messages or information exchanged between multiple devices in the embodiments of the present disclosure are only used for illustrative purposes, and are not used to limit the scope of these messages or information.

Referring to FIG. 1, the content display method in terminal devices includes displaying in a card type page and in a landing page. Users can be redirected to a landing page, by clicking on a card type page. However, the card type page and the landing page are usually treated as two independent pages in related technologies. Therefore, when redirecting from a card type page to a landing page, page rendering needs to be performed again, which can result in a white screen during the redirection process. Moreover, no data is shared between the two pages due to the independence of the card type page and the landing page. However, in practical applications, the landing page usually may contain the page content of the card type page. Therefore, the redirection methods in the related technologies may lead to repeated acquisition of the displayed content, and thus cause waste of network resources.

In view of this, the present disclosure provides a page display switching method, apparatus, storage medium, and electronic device for solving the problem of a white screen and resource waste caused by repeatedly acquiring display content during the process of jumping from a card type page to a landing page.

Figure 2:
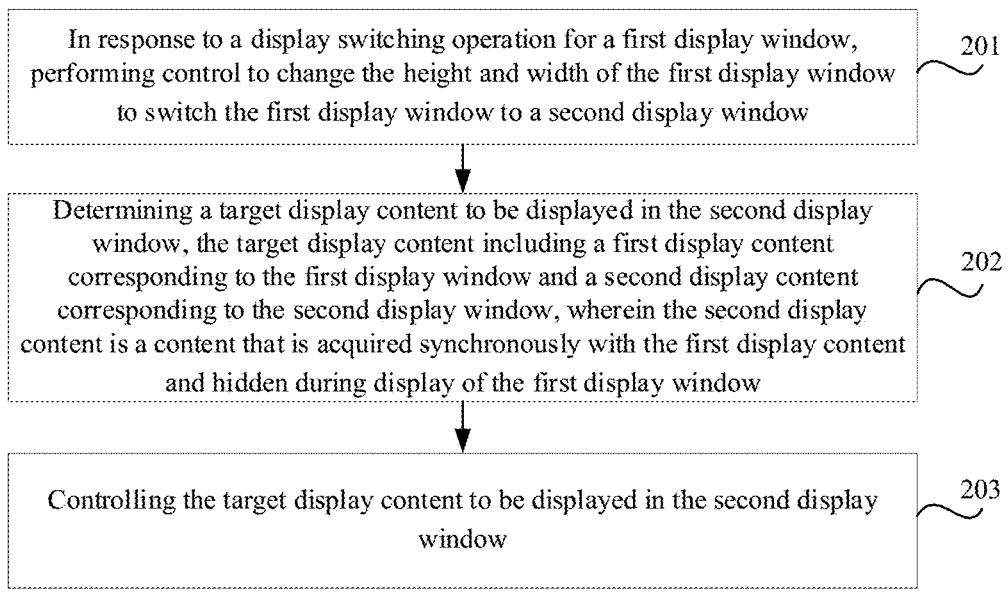
FIG. 2 is a flowchart of a page display switching method according to an exemplary embodiment of the present disclosure.

FIG. 2 is a flowchart of a page display switching method according to an exemplary embodiment of the present disclosure. Referring to FIG. 2, the page display switching method includes the following steps.

In step 201, in response to a display switching operation for a first display window, control is performed to change the height and width of the first display window to switch the first display window to a second display window.

For example, the display switching operation may be a click operation, a long press operation, a slide operation, or the like performed by a user at any position in the first display window, which is not limited in this embodiment. The first display window may be a window for displaying card type content, and the second display window may be a window for displaying landing page type content. Because a landing page usually contains richer content than a card, the size of the second display window can be larger than that of the first display window. Therefore, performing control to change the height and width of the first display window to switch the first display window to the second display window may comprise, for example, performing control to increase the height and width of the first display window by the same size, or increase the height of the first display window by a first size and increase the width of the first display window by a second size, etc., which is not limited in this embodiment and can be set according to different application scenarios.

In a possible implementation, performing control to change the height and width of the first display window to switch the first display window to a second display window may comprise: performing control to change the height of the first display window to a screen height, and the width of the first display window to a screen width, to switch the first display window to the second display window in full screen. That is to say, the second display window can be displayed in full-screen mode to display the content of the landing page in full-screen mode, facilitating users to have a detailed understanding of richer content corresponding to the card type content in the first display window. In the advertisement pushing scenario, more advertisement content can be pushed to users.

In step 202, a target display content to be displayed in the second display window is determined, the target display content including a first display content corresponding to the first display window and a second display content corresponding to the second display window, wherein the second display content is a content that is acquired synchronously with the first display content and hidden during display of the first display window.

For example, before the first display window is displayed, a first display content corresponding to the first display window can be acquired. For example, the first display content can be an advertisement content in the form of a card. Furthermore, in order to avoid the repeated acquisition of display content and to reduce waste of network resources, a second display content corresponding to the second display window can be synchronously acquired with the first display content. For example, the second display content can be a unique advertisement content on a landing page. After acquiring the second display content, the acquired second display content can be stored on the terminal device.

During the process of displaying the first display window, control may be performed to hide the display of the second display content, thus ensuring the normal display of the first display window while avoiding the repeated acquisition of the displayed content. In the subsequent process, if a display switching operation for the first display window is detected, the second display content stored in the terminal device can be acquired while or after switching the first display window to the second display window, and a target display content to be displayed in the second display window can be obtained by combining the original display content corresponding to the first display window (i.e., the first display content) with the second display content.

In step 203, the target display content is controlled to be displayed in the second display window.

According to the above method, the process of redirecting from card type content to landing page type content can be accomplished by window resizing and controlling the display status of the displayed content. Because a new second display window is acquired by resizing the first display window, which corresponds to displaying on the same page, page re-rendering is not necessary, which can reduce the page rendering time. Moreover, when the first display content of the first display window is acquired, the second display content of the new second display window can be synchronously acquired and stored locally on the terminal device, thereby avoiding repeated acquisition of the display content and reducing waste of network resources.

Some possible ways of performing control to display the target display content in the second display window will be described below.

In a possible implementation, performing control to display the target display content in the second display window may comprise: performing control to display the first display content in an upper display area of the second display window first, and then performing control to move the second display content into the screen from the outside to fill the remaining display area below the upper display area in the second display window.

For example, the upper display area can be predefined based on the first display content. For example, if more content is involved in the first display content, the upper display area can be set to a larger size to fully display the first display content. Conversely, if less content is involved in the first display content, the upper display area can be set to a smaller size, which is not limited in this embodiment, as long as the first display content can be completely displayed in the upper display area. In general, the second display window will have a larger display area than the corresponding display area of the first display window. Therefore, after the first display content is displayed in the second display window, i.e., in addition to the upper display area, there may also be a remaining display area located below the upper display area that can be used to display the second display content, so that the target display content, including the first display content and the second display content, can be completely displayed in the second display window.

For example, performing control to move the second display content into the screen from the outside may comprise performing control to move the second display content into the screen from the outside by translational motion, rotational motion, or 3D scrolling motion, etc. The animation effect of moving the second display content into the screen from the outside is not limited in this embodiment, and any movement animation effect in the related art can be adopted according to practical situations. In addition, it is possible to control the second display content to move it into the screen from the bottom of the screen, or from the left side of the screen, or from the bottom right corner of the screen, and so on, which is not limited in this embodiment and can be set according to actual situations. Alternatively, it is possible to control the speed at which the second display content is moved into the screen, such as controlling the second display content to move it into the screen quickly, or gradually and slowly, or the like, which is not limited in this embodiment.

Figure 3:
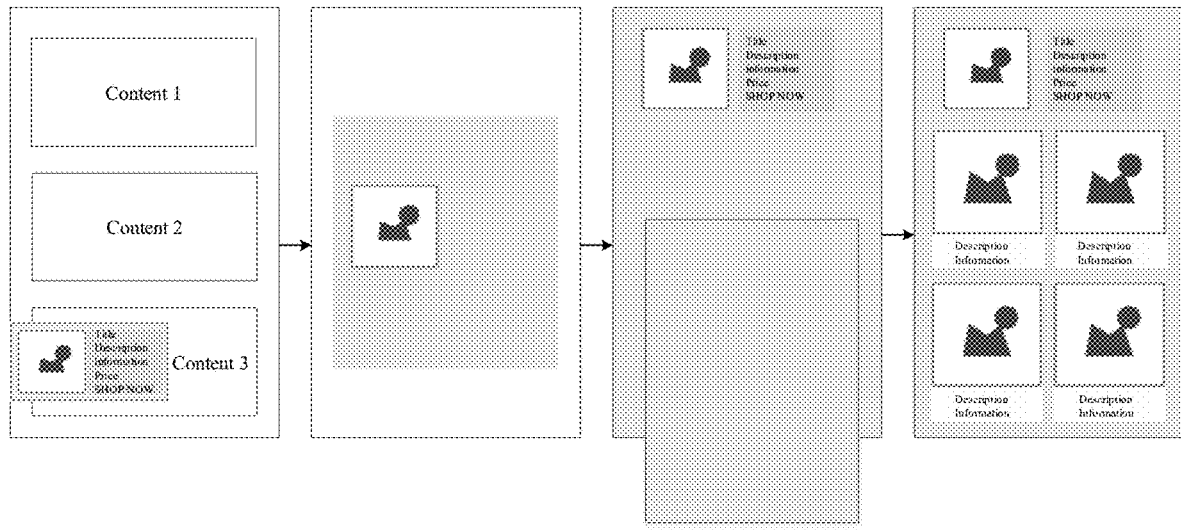
FIG. 3 is a schematic diagram of a page switching process in a page display switching method according to an exemplary embodiment of the present disclosure.

Taking moving into the screen from the bottom of the screen by translational motion as an example, referring to FIG. 3, when a user is browsing contents of a feed stream, a small window container can be rendered based on the contents of the feed stream currently browsed by the user, to display a first display window, in which a card type advertisement (i.e., the first display content) is displayed to the user. If the user is interested in the card type advertisement within the first display window and wants to learn more relevant content, the user can trigger a display switching operation for the first display window. Then, in response to the display switching operation, the height and width of the first display window can be increased by a preset size (which is determined based on the size of the first display window and the size of the screen) until the first display window changes into a second display window displayed in full-screen mode to block the contents of the feed stream displayed by the terminal device, thereby making it easier for the user to view the display content in the second display window. The second display window can be used to display an advertisement content of a landing page, which can include the original card type advertisement content (i.e., the first display content) in the first display window and a unique advertisement content (i.e., the second display content) of the landing page. After switching to the second display window, control can be performed to first display the content of the card type advertisement in the upper display area of the second display window. Then, control can be performed to move the unique advertisement content of the landing page from the bottom of the screen to the top of the screen by translational motion, so as to fill the remaining display area below the upper display area in the second display window, thus displaying the full advertisement content of the landing page.

In the method described above, an intermediate transition animation is added during the process of redirecting from the card type page to the landing page, which can make the redirection from the card type page to the landing page more smooth, reduce white screen or stuttering problems during the redirection process, and improve the problem of stiff transition caused by the independence of the card type page and the landing page, thus improving the user's perception of page switching.

In another possible implementation, performing control to change the height and width of the first display window to switch the first display window to a second display window may comprise: performing control to move the first display window off the screen, and change the height and width of the first display window to switch the first display window to the second display window after the first display window is completely moved off the screen. Correspondingly, performing control to display the target display content in the second display window may comprise: performing control to display the first display content in an upper display area of the second display window, and performing control to display the second display content in the remaining display area below the upper display area in the second display window, and then moving the second display window with the target display content into the screen from the outside.

That is to say, the first display window can be controlled to be moved off the screen as a whole. Thereafter, the screen can be switched to the second display window after the first display window is moved off the screen, and the display layout of the second display window can be adjusted. Then, the adjusted second display window is moved into the screen from the outside.

For example, performing control to move the first display window off the screen may comprise controlling the first display window to move it off the screen from the bottom of the screen, or from the left side of the screen, or from the upper left corner of the screen, etc., which is not limited in this embodiment and can be set according to practical situations. In addition, it is possible to control the speed at which the first display window is moved off the screen, e.g., to control the first display window to move it off the screen quickly, or gradually and slowly, or the like, which is not limited in this embodiment.

When it is determined that the first display window is completely moved off the screen, control can be performed to change the height and width of the first display window, so as to switch the first display window to the second display window. This process is similar to the control method described above and will not be repeated here.

Correspondingly, after switching the first display window to the second display window outside the screen, the display layout in the second display window can be controlled, e.g., the first display content is controlled to be displayed in the upper display area of the second display window, and the second display content is controlled to be displayed in the remaining display area below the upper display area in the second display window. Then, after adjusting the display layout in the second display window, the second display window with the target display content can be moved into the screen from the outside to display the second display window after the display switching operation. The method of moving the second display window into the screen from the outside is similar to the method of moving the second display content into the screen from the outside described above, and will not be repeated here.

Figure 4:
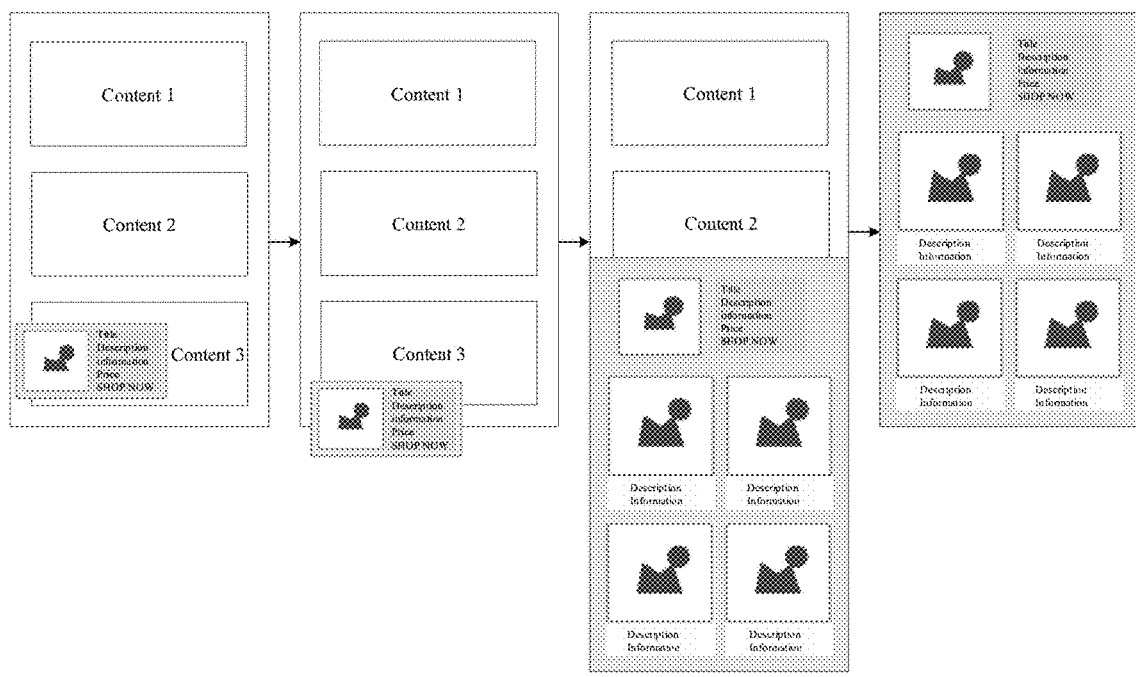
FIG. 4 is a schematic diagram of a page switching process in a page display switching method according to another exemplary embodiment of the present disclosure.

As an example, if the first display window is moved off from the bottom of the screen, and the second display window is moved into the screen from the bottom, referring to FIG. 4, when a user is browsing contents of a feed stream, a small window container can be rendered based on the contents of the feed stream currently browsed by the user, to display a first display window, in which a card type advertisement (i.e. the first display content) is displayed to the user. If the user is interested in the card type advertisement within the first display window and wants to learn more relevant content, the user can trigger a display switching operation for the first display window. Then, in response to the display switching operation, the first display window can be controlled to be moved off the screen from the bottom as a whole. After the first display window is completely moved off the screen, control can be performed to change the height and width of the first display window to switch the first display window to the second display window, e.g., to increase the height and width of the first display window to make the size of the second display window consistent with the screen size. The second display window can be used to display an advertisement content of a landing page, which can include a content of the card type advertisement (i.e., the first display content) in the first display window and a unique advertisement content (i.e., the second display content) of the landing page. After switching to the second display window, the display layout of the second display window can be adjusted. Specifically, control can be performed to first display the content of the card type advertisement in the upper display area of the second display window. Then, the unique advertisement content of the landing page can be controlled to be displayed in the remaining display area below the upper display area in the second display window. Finally, the second display window with an adjusted display layout can be gradually moved into the screen from the bottom of the screen to the top of the screen, thereby displaying the complete advertisement content of the landing page.

In the above method, an intermediate transition animation is added during the process of redirecting from the card type page to the landing page, which can make the redirection from the card type page to the landing page more smooth, reduce white screen or stuttering problems during the redirection process, and improve the problem of stiff transition caused by the independence of the card type page and the landing page, thus improving the user's perception of page switching.

In another possible implementation, performing control to display the target display content in the second display window may comprise: controlling the first display content to split it into a plurality of display sub-contents, each display sub-content corresponding to a preset target display area in the second display window. Then, for each display sub-content, it can be controlled to be moved to the corresponding target display area for display based on the display position parameters corresponding to the display sub-content; other display content associated with the display sub-content can be determined from the second display content, and can be controlled to be displayed in the remaining display area in the target display area.

For example, the number of display sub-contents obtained by splitting the first display content can be preset based on the amount of the first display content, and a target display area can be set accordingly in the second display window for each display sub-content. Due to the fixed display area of the first display content in the second display window, the number of display sub-contents obtained by splitting is different, and thus the size of the target display area for each display sub-content in the second display window is also different. For example, if the first display content is split into four display sub-contents, the target display area of each display sub-content in the second display window has a first size. If the first display content is split into seven display sub-contents, the target display area of each display sub-content in the second display window has a second size. It can be appreciated that the first size is larger than the second size.

For example, display position parameters are used to represent position coordinates of the target display area corresponding to a display sub-content, such as the coordinates of each vertex of the target display area, etc., which is not limited in this embodiment. According to the display position parameters, a display sub-content can be controlled to be moved to a corresponding target display area for display, thereby achieving the display of the first display content in the second display window.

Furthermore, for the display of the second display content in the second display window, further display content associated with the display sub-content can be determined from the second display content, and then can be controlled to be displayed in the remaining display area of the target display area. For example, a second display content associated with each display sub-content obtained by splitting can be predetermined, for example, the same identification information can be added to a display sub-content and a second display content associated with the display sub-content, etc., which is not limited in this embodiment.

For example, controlling the display sub-content to move it to the corresponding target display area for display may comprise controlling the display sub-content to move it along a preset motion path by translational motion or by scrolling motion, etc., which is not limited in the embodiments of the disclosure. The start point of the preset motion path is a position of the display sub-content in the first display window, the end point is the position of the target display area, and the middle path can be set according to actual situations, which is not limited in the embodiments of the disclosure. In addition, controlling the other display content to be displayed in the remaining display area in the target display area may comprise, after determining the other display content, controlling the other display content to move it into the screen from the outside, e.g., from the bottom of the screen, etc., to fill the remaining display area in the target display area, which is not limited in the embodiments of the disclosure, and reference can be made to the method of moving the second display content into the screen described above.

Figure 5:
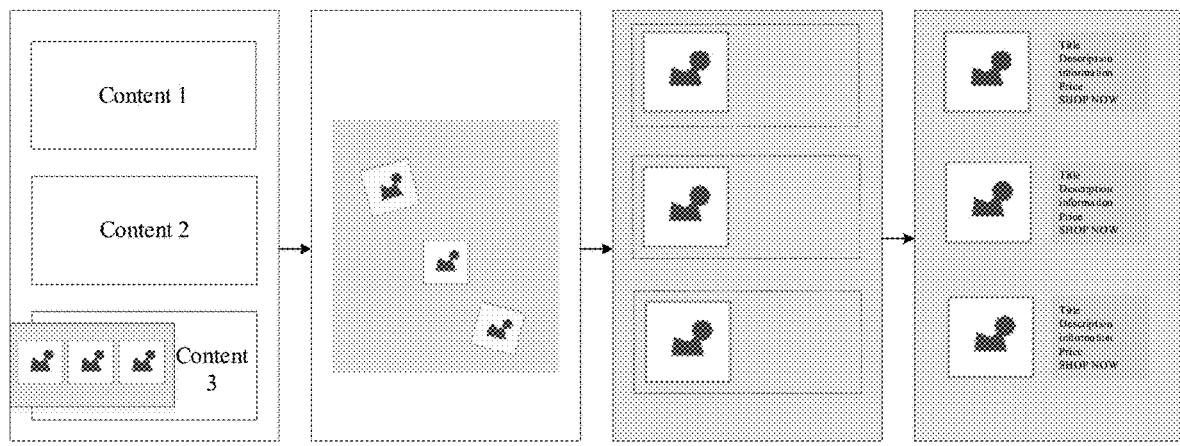
FIG. 5 is a schematic diagram of a page switching process in a page display switching method according to another exemplary embodiment of the present disclosure.

In practical applications, the first display window can be used to display a list of products that the user is interested in, including multiple product thumbnails. When a user clicks on any position in the first display window, the user usually wants to know the details of a specific product. In this scenario, an embodiment of the present disclosure provides a split transition animation. Referring to FIG. 5, in response to a display switching operation for a first display window, control is performed to change the height and width of the first display window to switch the first display window to a second display window. At the same time, the target display content to be displayed in the second display window can be determined, which includes a product list (i.e., the first display content) and the corresponding details of each product in the product list (i.e., the second display content). Then, the product list can be split into multiple display sub-contents, each corresponding to a product thumbnail in the product list. Then, for each product thumbnail (i.e., each display sub-content), according to display position parameters corresponding to the product thumbnail, it can be controlled to be moved to a corresponding target display area in a landing page (such as the area in the dashed box in FIG. 5) for display, and product detail information associated with the product thumbnail can be determined from the product detail information (i.e., the second display content), and then the product detail information can be controlled to be displayed in the remaining display area in the target display area, thereby showing the detailed product information to the user in the second display window.

In the above method, a split transition animation is added during the process of redirecting from the card type page to the landing page, which can make the redirection from the card type page to the landing page more smooth, reduce white screen or stuttering problems during the redirection process, and improve the problem of stiff transition caused by the independence of the card type page and the landing page, thus improving the user's perception of page switching.

It should be understood that in practical applications, multiple possible transition animations can be preset for card type pages and landing pages in different ways as described above, and then specific transition animations can be determined based on a user's choice, so that the page switching method in the embodiments of the disclosure can be widely applied to different scenarios and meet the different needs of users.

In a possible implementation, during the process of switching the first display window to the second display window, the background of the second display window can also be controlled to enhance the user's perception. Specifically, the background of the first display window can be controlled to become transparent, and after the background of the first display window has become fully transparent, the transparency of the first display window can be controlled to decrease to obtain a second display window whose transparency equals to a preset threshold; and/or, when the first display window is displayed on an upper layer of a current content page on the screen, the background color of the second display window is controlled based on the display tone of the current content page, to cause the background color of the second display window to match the display tone of the current content page.

For example, the preset threshold can be set according to actual situations, which is not limited in this embodiment. In addition, correspondence between different display tones and background colors of the second display window can be preset. Therefore, when the display tone of the current content page is determined, a background color of the second display window can be determined based on that display tone and the correspondence.

For example, when the user triggers a display switching operation, the first display window can gradually become transparent. After the first display window has become fully transparent, the transparency of the first display window is controlled to decrease, that is, the first display window is controlled to gradually become opaque. Because this process can be executed during the process of switching the first display window to the second display window, what users will see is the first window gradually increasing in size and becoming less transparent. When the background of the first display window becomes fully transparent, the first display window may be completely switched to the second display window, allowing the user to see the second display window with a larger size gradually emerging until the transparency of the second display window reaches the preset threshold, at which point the user can see the entire second display window.

As another example, when a user browses contents of a feed stream, the first display window can be displayed on an upper layer of the contents of the feed stream. Therefore, the background color of the second display window can be controlled based on the display tone of the contents of the feed stream, to cause the background color of the second display window to match the display tone of the contents of the feed stream. For example, if the content of the feed stream is a video with a blue sky, it can be determined that the display tone of the content of the feed stream is blue, and thus the background color of the second display window can be controlled to be blue.

Through the above method, the background display of the second display window can be controlled during the process of redirecting from a card type page to a landing page, making the background transition during the above process natural and improving the user's perception of page switching.

After the second display window is displayed, the user may wish to switch back to the first display window to continue browsing the screen display content before switching the first display window to the second display window.

Therefore, in a possible implementation, in response to a display switching operation for the second display window, the second display window can be controlled to be moved off the screen; after the second display window is completely moved off the screen, control is performed to change the height and width of the second display window to switch the second display window to the first display window; the first display content can then be restored and displayed in the first display window, and the second display content can be hidden and not displayed; and finally, the first display window with the first display content is controlled to be moved into the screen from the outside.

For example, the display switching operation for the second display window may be a click operation, a long press operation, a slide operation, or the like performed by a user at any position in the second display window, which is not limited in this embodiment. The method of controlling the second display window to move the second display window off the screen is similar to the method of controlling the first display window to move the first display window off the screen described above, and will not be repeated here.

For example, performing control to change the height and width of the second display window to switch the second display window to the first display window may comprise, performing control to decrease the height and width of the second display window by the same size, or to decrease the height of the second display window by a third size and decrease the width of the second display window by the fourth size, etc., which is not limited in this embodiment. In specific implementations, the size by which the second display window is controlled to change can be determined by reversely applying the size change information that is used for switching the first display window to the second display window.

After switching the second display window to the first display window, the first display content corresponding to the first display window can be controlled to be restored and displayed in the first display window, and the second display content can be controlled to be hidden to complete the display layout adjustment for the first display window. Finally, the first display window with the adjusted display layout can be moved into the screen from the outside, that is, the first display window with the first display content can be controlled to be moved into the screen from the outside to restore the display of the first display window from the second display window. The method of moving the first display window into the screen from the outside is similar to the method of moving the second display content into the screen from the outside described above, and will not be repeated here.

Figure 6:
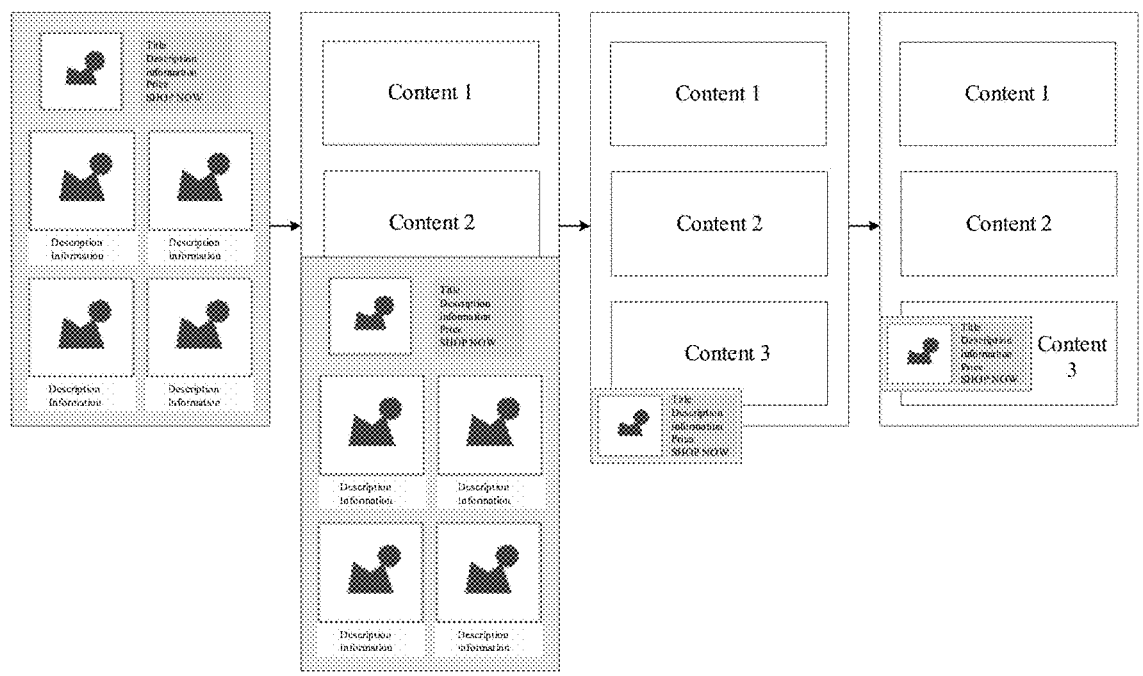
FIG. 6 is a schematic diagram of a page switching process in a page display switching method according to another exemplary embodiment of the present disclosure.

For example, referring to FIG. 6, the first display window is used to display a card type advertisement, and the second display window is used to display a landing page type advertisement. After switching the first display window to the second display window, in response to a display switching operation for the second display window, the second display window can be controlled to be moved off the screen first, and after the second display window is completely moved off the screen, the height and width of the second display window can be changed to switch the second display window to the first display window. At the same time, it is possible to control the first display content to be restored and displayed in the first display window, and control the second display content to be hidden. Finally, the first display window with the first display content is controlled to be moved into the screen from the outside to restore the display of the card type advertisement.

Of course, in other possible implementations, the method of restoring the display from the landing page to the card type content may comprise the reverse application of any of the above animations for redirecting from the card type content to the landing page type content, such as a splitting animation for redirecting from the card type content to the landing page type content. Correspondingly, in the process of redirecting from the landing page type content to the card type content, the landing page type content can first be split into display sub-contents corresponding to card type contents; and then each display sub-content is controlled to be moved to a corresponding position in the first display window to restore the display of the card type advertisement. The specific process can be deduced from the above explanation about the splitting animation, and will not be repeated here.

According to any of the page switching methods provided in the embodiments of the present disclosure, the process of redirecting from a card type content to a landing page type content can be accomplished by window resizing and controlling the display status of the displayed content. Because a new second display window is acquired by resizing the first display window, which corresponds to displaying on the same page, page re-rendering is not necessary, which can reduce the page rendering time. Moreover, when the first display content of the first display window is acquired, the second display content of the new second display window can be synchronously acquired and stored locally on the terminal device, thereby avoiding repeated acquisition of the display content and reducing waste of network resources. In addition, an intermediate transition animation is added during the process of redirecting from the card type page to the landing page, which can make page switching more smooth, reduce white screen or stuttering problems, and improve the problem of stiff transition caused by the independence of the card type page and the landing page, thus improving the user's perception of page switching.

Figure 7:
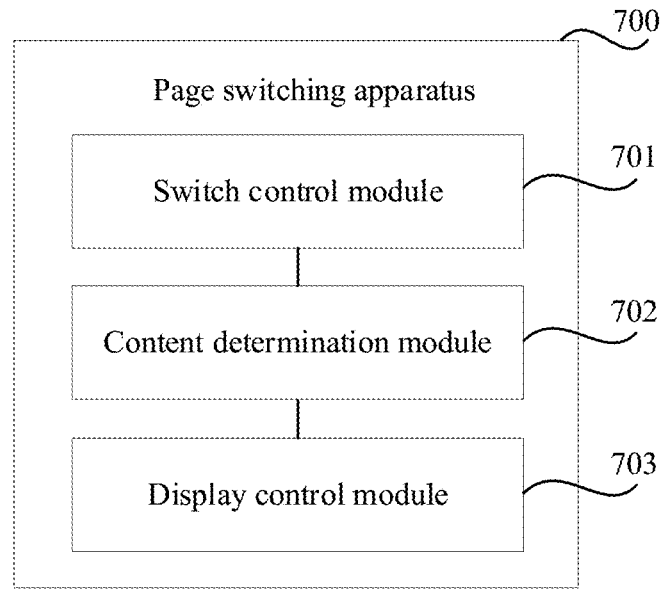
FIG. 7 is a block diagram of a page display switching apparatus according to an exemplary embodiment of the present disclosure.

Based on the same inventive concept, an embodiment of the present disclosure further provides a page switching apparatus that can be part or all of an electronic device in the form of software, hardware, or a combination of both. Referring to FIG. 7, the page switching apparatus comprises:

a switch control module 701 for, in response to a display switching operation for a first display window, performing control to change the height and width of the first display window to switch the first display window to a second display window;

a content determination module 702 for determining a target display content to be displayed in the second display window, which includes a first display content corresponding to the first display window and a second display content corresponding to the second display window, wherein the second display content is a content that is acquired synchronously with the first display content and hidden during a display process of the first display window;

a display control module 703 for performing control to display the target display content in the second display window.

Optionally, the display control module 703 is used for:
performing control to display the first display content in an upper display area of the second display window;
performing control to move the second display content into the screen from the outside to fill a remaining display area below the upper display area in the second display window.

Optionally, the switch control module 701 is used for:

performing control to move the first display content off the screen, and controlling the first display window to change its height and width after the first display window is completely moved off the screen, to switch the first display window to a second display window;

the display control module 703 is used for:

performing control to display the first display content in an upper display area of the second display window, and performing control to display the second display content in the remaining display area below the upper display area in the second display window;

moving the second display window with the target display content into the screen from the outside.

Optionally, the display control module 703 is used for:

controlling the first display content to split it into a plurality of display sub-contents, each display sub-content corresponding to a preset target display area in the second display window;

for each display sub-content, controlling the display sub-content to move it to the corresponding target display area for display based on the display position parameters corresponding to the display sub-content, determining other display content associated with the display sub-content from the second display content, and controlling the other display content to display it in the remaining display area in the target display area.

Optionally, the apparatus 700 further comprises:

a first control module for, in response to a display switching operation for the second display window, controlling the second display window to move it off the screen; and after the second display window is completely moved off the screen, performing control to change the height and width of the second display window to switch the second display window to the first display window;

a display restoring module for controlling the first display content to be restored and displayed in the first display window, and controlling the second display content to hide the display of the second display content;

a second control module for controlling the first display window with the first display content to move it into the screen from the outside.

Optionally, the apparatus 700 further comprises:

a first background control module for controlling the background of the first display window to become transparent during the process of switching the first display window to the second display window, and after the background of the first display window has become fully transparent, performing control to decrease the transparency of the first display window to obtain a second display window whose transparency equals to a preset threshold; and/or a second background control module for, when the first display window is displayed on an upper layer of a current content page on the screen, controlling the background color of the second display window based on the display tone of the current content page, to cause the background color of the second display window to match the display tone of the current content page.

Optionally, the switch control module 701 is used for:

performing control to change the height of the first display window to a screen height, and the width of the first display window to a screen width, to switch the first display window to the second display window in full screen.

For the apparatus described in the above embodiment, the specific ways in which the various modules of the apparatus operate have been described in detail in the relevant embodiments of the method, and will not be explained in detail here.

Based on the same inventive concept, an embodiment of the present disclosure further provides a computer-readable medium stored thereon a computer program that, when executed by a processing device, carries out the steps of any of the page display switching methods described above.

Based on the same inventive concept, an embodiment of the present disclosure further provides an electronic device, including:

a storage apparatus having stored thereon a computer program;

a processing apparatus for executing the computer program in the storage apparatus to implement the steps of any of the page display switching methods described above.

Through the above technical solution, the process of redirecting from a card type content to a landing page type content can be accomplished by window resizing and controlling the display status of the displayed content. Because a new second display window is acquired by resizing the first display window, which corresponds to displaying on the same page, page re-rendering is not necessary, which can reduce the page rendering time. Moreover, when the first display content of the first display window is acquired, the second display content of the new second display window can be synchronously acquired and stored locally on the terminal device, thereby avoiding repeated acquisition of display content and reducing waste of network resources.

Figure 8:
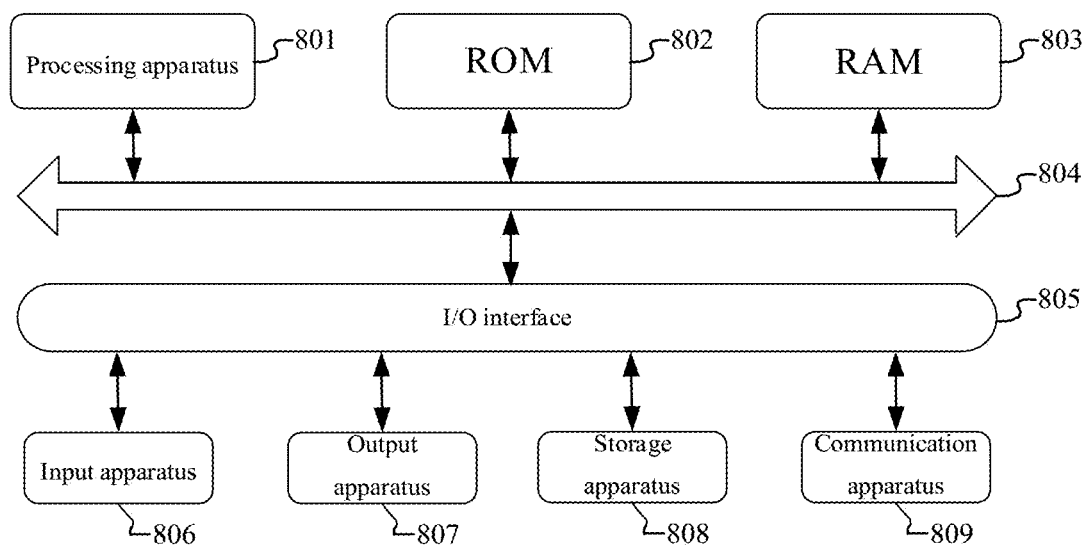
FIG. 8 is a block diagram of an electronic device according to an exemplary embodiment of the present disclosure.

Referring to FIG. 8, a structural diagram of an electronic device 800 suitable for implementing the embodiments of the present disclosure is shown. The terminal device of the embodiments of the present disclosure may include, but not limited to, a mobile terminal such as a mobile phone, a notebook computer, a digital broadcast receiver, a PDA (Personal Digital Assistant), a tablet computer, a PMP (Portable Multimedia Player), an on-board terminal (such as an on-board navigation terminal), and the like, and a fixed terminal such as a digital TV, a desktop computer, and the like. The electronic device shown in FIG. 8 is merely an example and should not impose any limitation on the function and use scope of the embodiments of the present disclosure.

As shown in FIG. 8, the electronic device 800 may include a processing apparatus (e.g., a central processing unit, a graphics processor) 801, which may perform various appropriate actions and processes according to a program stored in a Read Only Memory (ROM) 802 or a program loaded from a storage device 808 into a Random Access Memory (RAM) 803. In the RAM 803, various programs and data required for the operation of the electronic device 800 are also stored. The processing apparatus 801, ROM 802, and RAM 803 are connected to each other through a bus 804. An input/output (I/O) interface 805 is also connected to the bus 804.

Generally, the following apparatuses can be connected to the I/O interface 805: input apparatuses 806 including, for example, a touch screen, a touch pad, a keyboard, a mouse, a camera, a microphone, an accelerometer, a gyroscope, etc.; output apparatuses 807 including, for example, a liquid crystal display (LCD), a speaker, a vibrator, etc.; a storage apparatus 808 such as a magnetic tape, a hard disk, etc.; and a communication apparatus 809. The communication apparatus 809 enables the electronic device 800 to perform wired or wireless communications with other devices to exchange data. Although FIG. 8 shows the electronic device 800 with various apparatuses, it should be understood that it is not required to implement or have all of these apparatuses. Alternatively, it may implement or have more or fewer apparatuses.

In particular, according to an embodiment of the present disclosure, the processes described above with reference to the flowcharts can be implemented as a computer software program. For example, an embodiment of the present disclosure includes a computer program product, which includes a computer program carried on a non-transitory computer readable medium, and containing program code for executing the method shown in a flowchart. In such an embodiment, the computer program may be downloaded and installed from the network through the communication apparatus 809, or installed from the storage apparatus 808, or from the ROM 802. When the computer program is executed by the processing apparatus 801, the above functions defined in the method of the embodiment of the present disclosure are performed.

It should be noted that the computer-readable medium described above in the present disclosure may be a computer-readable signal medium or a computer-readable storage medium, or any combination thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read only memory (EPROM or flash), fiber optics, a portable compact disk Read only memory (CD-ROM), an optical storage device, a magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include data signals that are propagated in the baseband or as part of a carrier, carrying computer readable program code therein. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code contained on a computer readable medium can be transmitted by any suitable medium, including but not limited to wire, fiber optic cable, RF (radio frequency), etc., or any suitable combination of the foregoing.

In some embodiments, communication can be performed using any currently known or future developed network protocol such as HTTP (HyperText Transfer Protocol), and interconnection can be made with any form or medium of digital data communications, e.g., a communication network. Examples of communication networks include a local area network ("LAN") and a wide area network ("WAN"), a network of networks (e.g., the Internet), and end-to-end networks (for example, ad hoc end-to-end networks), as well as any currently known or future developed networks.

The above computer-readable medium may be included in the electronic device described above; or it may exist alone without being assembled into the electronic device.

The computer-readable medium carries one or more programs that, when executed by the electronic device, cause the electronic device to perform operations of: in response to a display switching operation for a first display window, performing control to change the height and width of the first display window to switch the first display window to a second display window; determining a target display content to be displayed in the second display window, which includes a first display content corresponding to the first display window and a second display content corresponding to the second display window, wherein the second display content is a content that is acquired synchronously with the first display content and hidden during display of the first display window; performing control to display the target display content in the second display window.

The computer program code for executing operations of the present disclosure may be written in one or more programming design languages or a combination thereof, the programming design languages including, but not limited to, object-oriented programming design languages, such as Java, Smalltalk, C++, etc., as well as conventional procedural programming design languages, such as "C" language or similar programming design languages. A program code may be completely executed on a user computer, or partly executed on a user computer, or executed as an independent software package, partly executed on a user computer and partly executed on a remote computer, or completely executed on a remote computer or server. In the circumstances involving a remote computer, the remote computer may be connected to the user computer through any kind of network, including local area network (LAN) or wide area network (WAN), or may be connected to an external computer (for example, through an Internet connection provided by an Internet service provider).

The flowcharts and block diagrams in the drawings illustrate the architecture, functionality, and operation of some possible implementations of systems, methods and computer program products according to various embodiments of the disclosure. In this regard, each block in the flowcharts or block diagrams may represent a module, program segment, or portion of code, which comprises one or more executable instructions for implementing the specified logic functions. It should also be noted that, in some alternative implementations, the functions noted in the blocks may occur out of the order noted in the figures. For example, two blocks shown in succession may be executed substantially concurrently, or the blocks may sometimes be executed in a reverse order, depending upon the functionality involved. It will also be noted that each block of the block diagrams and/or flowcharts, and combinations of blocks in the block diagrams and/or flowcharts, can be implemented by a special purpose hardware-based system that performs the specified functions or acts, or combinations of special purpose hardware and computer instructions.

The modules involved in the embodiments described in the present disclosure can be implemented in software or hardware. The names of the modules do not constitute a limitation on the modules themselves under certain circumstances.

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash), fiber optics, a portable compact disk read only memory (CD-ROM), an optical storage device, a magnetic storage device, or any suitable combination of the foregoing.

According to one or more embodiments of the present disclosure, Example 1 provides a page display switching method, including:
 in response to a display switching operation for a first display window, performing control to change the height and width of the first display window to switch the first display window to a second display window;
 determining a target display content to be displayed in the second display window, which includes a first display content corresponding to the first display window and a second display content corresponding to the second display window, wherein the second display content is a content that is acquired synchronously with the first display content and hidden during display of the first display window;
 performing control to display the target display content in the second display window.

According to one or more embodiments of the present disclosure, Example 2 provides the method of Example 1, wherein performing control to display the target display content in the second display window comprises:
 controlling the first display content to display it in an upper display area of the second display window;
 performing control to move the second display content into the screen from the outside to fill a remaining display area below the upper display area in the second display window.

According to one or more embodiments of the present disclosure, Example 3 provides the method of Example 1, wherein performing control to change the height and width of the first display window to switch the first display window to a second display window comprises:
 performing control to move the first display content off the screen, and performing control to change the height and width of the first display window after the first display window is completely moved off the screen, to switch the first display window to a second display window;
 performing control to display the target display content in the second display window comprises:
 performing control to display the first display content in an upper display area of the second display window, and performing control to display the second display content in the remaining display area below the upper display area in the second display window;
 moving the second display window with the target display content into the screen from the outside.

According to one or more embodiments of the present disclosure, Example 4 provides the method of Example 1, wherein performing control to display the target display content in the second display window comprises:
 controlling the first display content to split it into a plurality of display sub-contents, each display sub-content corresponding to a preset target display area in the second display window;
 for each display sub-content, controlling the display sub-content to move it to the corresponding target display area for display based on the display position parameters corresponding to the display sub-content, determining other display content associated with the display sub-content from the second display content, and controlling the other display content to display it in the remaining display area in the target display area.

According to one or more embodiments of the present disclosure, Example 5 provides the method of any of Example 1 to Example 4, wherein the method further comprises:
 in response to a display switching operation for the second display window, controlling the second display window to move it off the screen; after the second display window is completely moved off the screen, performing control to change the height and width of the second display window to switch the second display window to the first display window;
 controlling the first display content to be restored and displayed in the first display window, and controlling the second display content to hide the display of the second display content;
 controlling the first display window with the first display content to move it into the screen from the outside.

According to one or more embodiments of the present disclosure, Example 6 provides the method of any of Example 1 to Example 4, wherein during the process of switching the first display window to the second display window, the method further comprises:
 controlling the background of the first display window to become transparent, and after the background of the first display window has become fully transparent, controlling the transparency of the first display window to decrease to obtain a second display window whose transparency equals to a preset threshold; and/or
 when the first display window is displayed on an upper layer of a current content page on the screen, controlling the background color of the second display window based on the display tone of the current content page, to cause the background color of the second display window to match the display tone of the current content page.

According to one or more embodiments of the present disclosure, Example 7 provides the method of any of Example 1 to Example 4, wherein performing control to change the height and width of the first display window to switch the first display window to a second display window comprises:
 performing control to change the height of the first display window to a screen height, and the width of the first display window to a screen width, to switch the first display window to the second display window in full screen.

According to one or more embodiments of the present disclosure, Example 8 provides a page display switching apparatus, including:
 a switch control module for, in response to a display switching operation for a first display window, performing control to change the height and width of the first display window to switch the first display window to a second display window;
a content determination module for determining a target display content to be displayed in the second display window, which includes a first display content corresponding to the first display window and a second display content corresponding to the second display window, wherein the second display content is a content that is acquired synchronously with the first display content and hidden during display of the first display window;
a display control module for performing control to display the target display content in the second display window.

According to one or more embodiments of the present disclosure, Example 9 provides the apparatus of Example 8, wherein the display control module is used for:
controlling the first display content to display it in an upper display area of the second display window;
performing control to move the second display content into the screen from the outside to fill a remaining display area below the upper display area in the second display window.

According to one or more embodiments of the present disclosure, Example 10 provides the apparatus of Example 8, wherein the switch control module is used for:
performing control to move the first display content off the screen, and controlling the first display window to change its height and width after the first display window is completely moved off the screen, to switch the first display window to a second display window;
the display control module is used for:
performing control to display the first display content in an upper display area of the second display window, and performing control to display the second display content in the remaining display area below the upper display area in the second display window;
moving the second display window with the target display content into the screen from the outside.

According to one or more embodiments of the present disclosure, Example 11 provides the apparatus of Example 8, wherein the display control module is used for:
controlling the first display content to split it into a plurality of display sub-contents, each display sub-content corresponding to a preset target display area in the second display window;
for each display sub-content, controlling the display sub-content to move it to the corresponding target display area for display based on the display position parameters corresponding to the display sub-content, determining other display content associated with the display sub-content from the second display content, and controlling the other display content to display it in the remaining display area in the target display area.

According to one or more embodiments of the present disclosure, Example 12 provides the apparatus of any of Example 8 to Example 11, wherein the apparatus further comprises:
a first control module for, in response to a display switching operation for the second display window, controlling the second display window to move it off the screen; after the second display window is completely moved off the screen, performing control to change the height and width of the second display window to switch the second display window to the first display window;
a display restoring module for controlling the first display content to be restored and displayed in the first display window, and controlling the second display content to hide the display of the second display content;
a second control module for controlling the first display window with the first display content to move it into the screen from the outside.

According to one or more embodiments of the present disclosure, Example 13 provides the apparatus of any of Example 8 to Example 11, wherein the apparatus further comprises:
a first background control module for controlling the background of the first display window to become transparent during the process of switching the first display window to the second display window, and after the background of the first display window has become fully transparent, performing control to decrease the transparency of the first display window to obtain a second display window whose transparency equals to a preset threshold; and/or
a second background control module for, when the first display window is displayed on an upper layer of a current content page on the screen, controlling the background color of the second display window based on the display tone of the current content page, to cause the background color of the second display window to match the display tone of the current content page.

According to one or more embodiments of the present disclosure, Example 14 provides the apparatus of any of Example 8 to Example 11, wherein the switch control module is used for:
performing control to change the height of the first display window to a screen height, and the width of the first display window to a screen width, to switch the first display window to the second display window in full screen.

According to one or more embodiments of the present disclosure, Example 15 provides a computer-readable medium stored thereon a computer program that, when executed by a processing device, carries out one or more steps of the page display switching method described in any one of Example 1 to Example 7.

According to one or more embodiments of the present disclosure, Example 16 provides an electronic device, including:
a storage apparatus having stored thereon a computer program;
a processing apparatus for executing the computer program in the storage apparatus to implement one or more steps of the page display switching method described in any of Example 1 to Example 7.

According to one or more embodiments of the present disclosure, Example 17 provides a computer program, including: instructions that, when executed by a processor, cause the processor to perform one or more steps of the page display switching method described in any of Example 1 to Example 7.

According to one or more embodiments of the present disclosure, Example 18 provides a computer program product including instructions that, when executed by a processor, cause the processor to perform one or more steps of the page display switching method described in any of Example 1 to Example 7.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the concept of the disclosure, such as, technical solutions formed by replacing the above features with technical features having similar functions to those disclosed in the present disclosure (but is not limited thereto).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in languages specific to structural features and/or logical actions of the method, it should be understood that the subject matter defined in the appended claims is not necessarily limited to the specific features or actions described above. On the contrary, the specific features and actions described above are merely exemplary forms of implementing the claims. For the apparatuses described in the above embodiments, the specific ways in which the various modules of the apparatus operate have been described in detail in the relevant embodiments of the method, and will not be explained in detail here.

What is claimed is:

1. A page display switching method, comprising:
    displaying a first display window including a first display content in a current content page on a screen of an electronic device, wherein the first display content represents a content including an advertisement content in a form of a card type;
    in response to a display switching operation from a user input for a first display window, performing control to increase the height and width of the first display window in size until the first display window changes into a second display window displayed in full screen, and switch the first display window to the second display window without the current content page re-rendering;
    determining a target display content to be displayed in the second display window, which includes the first display content corresponding to the first display window and a second display content corresponding to the second display window, wherein the second display content is a content of a landing page that is acquired synchronously with the first display content and hidden during display of the first display window; and
    performing control to display the target display content in the second display window, wherein during the process of switching the first display window to the second display window, the page display switching method further comprises:
    controlling a background of the first display window to become transparent, and after the background of the first display window has become fully transparent, controlling the transparency of the first display window to decrease to obtain the second display window whose transparency equals to a preset threshold;
    when the first display window is displayed on an upper layer of the current content page on the screen of the electronic device, controlling a background color of the second display window based on a display tone of the current content page, to cause the background color of the second display window to match the display tone of the current content page; and
    adjusting a display layout of the second display window after switching to the second display window for the first display content of the current content page and the second display content of the landing page.

2. The page display switching method according to claim 1, wherein performing control of the display layout to display the target display content in the second display window comprises:
    performing control to display the first display content in an upper display area of the second display window;
    performing control to move the second display content into the screen from the outside to fill a remaining display area below the upper display area in the second display window.

3. The page display switching method according to claim 1, wherein performing control to increase the height and width of the first display window in size to switch the first display window to the second display window comprises:
    performing control to move the first display content off the screen, and performing control to increase the height and width of the first display window in size after the first display window is completely moved off the screen, to switch the first display window to the second display window;
    performing control to display the target display content in the second display window comprises:
    performing control to display the first display content in an upper display area of the second display window, and performing control to display the second display content in the remaining display area below the upper display area in the second display window;
    moving the second display window with the target display content into the screen from the outside.

4. The page display switching method according to claim 1, wherein performing control to display the target display content in the second display window comprises:
    controlling the first display content to split it into a plurality of display sub-contents, each display sub-content corresponding to a preset target display area in the second display window; for each display sub-content, controlling the display sub-content to move it to the corresponding target display area for display based on display position parameters corresponding to the display sub-content, determining other display content associated with the display sub-content from the second display content, and controlling the other display content to display it in the remaining display area in the target display area.

5. The page display switching method according to claim 1, the page display switching method further comprises:
    in response to a display switching operation for the second display window, controlling the second display window to move it off the screen; and
    after the second display window is completely moved off the screen, performing control to decrease the height and width of the second display window in size to switch the second display window to the first display window;

controlling the first display content to be restored and displayed in the first display window, and controlling the second display content to hide the display of the second display content;

controlling the first display window with the first display content to move it into the screen from the outside.

6. A non-transitory computer-readable medium stored thereon a computer program that, when executed by a processor, causes the processor to perform operations comprising:

displaying a first display window including a first display content in a current content page on a screen of an electronic device, wherein the first display content represents a content including an advertisement content in a form of a card type;

in response to a display switching operation from a user input for a first display window, performing control to increase the height and width of the first display window in size until the first display window changes into a second display window displayed in full screen, and switch the first display window to the second display window without the current content page re-rendering;

determining a target display content to be displayed in the second display window, which includes the first display content corresponding to the first display window and a second display content corresponding to the second display window, wherein the second display content is a content of a landing page that is acquired synchronously with the first display content and hidden during display of the first display window; and performing control to display the target display content in the second display window, wherein during the process of switching the first display window to the second display window, the operations further comprises:

controlling a background of the first display window to become transparent, and after the background of the first display window has become fully transparent, controlling the transparency of the first display window to decrease to obtain the second display window whose transparency equals to a preset threshold;

when the first display window is displayed on an upper layer of the current content page on the screen of the electronic device, controlling a background color of the second display window based on a display tone of the current content page, to cause the background color of the second display window to match the display tone of the current content page; and adjusting a display layout of the second display window after switching to the second display window for the first display content of the current content page and the second display content of the landing page.

7. The non-transitory computer-readable medium according to claim 6, wherein performing control of the display layout to display the target display content in the second display window comprises:

performing control to display the first display content in an upper display area of the second display window;

performing control to move the second display content into the screen from the outside to fill a remaining display area below the upper display area in the second display window.

8. The non-transitory computer-readable medium according to claim 6, wherein performing control to increase the height and width of the first display window in size to switch the first display window to the second display window comprises:

performing control to move the first display content off the screen, and performing control to increase the height and width of the first display window in size after the first display window is completely moved off the screen, to switch the first display window to the second display window;

performing control to display the target display content in the second display window comprises:

performing control to display the first display content in an upper display area of the second display window, and performing control to display the second display content in the remaining display area below the upper display area in the second display window;

moving the second display window with the target display content into the screen from the outside.

9. The non-transitory computer-readable medium according to claim 6, wherein performing control to display the target display content in the second display window comprises:

controlling the first display content to split it into a plurality of display sub-contents, each display sub-content corresponding to a preset target display area in the second display window; for each display sub-content, controlling the display sub-content to move it to the corresponding target display area for display based on display position parameters corresponding to the display sub-content, determining other display content associated with the display sub-content from the second display content, and controlling the other display content to display it in the remaining display area in the target display area.

10. The non-transitory computer-readable medium according to claim 6, the operations further comprising:

in response to a display switching operation for the second display window, controlling the second display window to move it off the screen; and after the second display window is completely moved off the screen, performing control to decrease the height and width of the second display window in size to switch the second display window to the first display window;

controlling the first display content to be restored and displayed in the first display window, and controlling the second display content to hide the display of the second display content;

controlling the first display window with the first display content to move it into the screen from the outside.

11. An electronic device, comprising:

a storage apparatus having stored thereon a computer program;

a processor for executing the computer program in the storage apparatus to implement operations comprising:

displaying a first display window including a first display content in a current content page on a screen of an electronic device, wherein the first display content represents a content including an advertisement content in a form of a card type;

in response to a display switching operation from a user input for a first display window, performing control to increase the height and width of the first display window in size until the first display window changes into a second display window displayed in full screen, and switch the first display window to the second display window without the current content page re-rendering;

determining a target display content to be displayed in the second display window, which includes the first display content corresponding to the first display window and a second display content corresponding to the second display window, wherein the second display content is a content of a landing page that is acquired synchronously with the first display content and hidden during display of the first display window; and performing control to display the target display content in the second display window, wherein during the process of switching the first display window to the second display window, the operations further comprise:

controlling a background of the first display window to become transparent, and after the background of the first display window has become fully transparent, controlling the transparency of the first display window to decrease to obtain the second display window whose transparency equals to a preset threshold;

when the first display window is displayed on an upper layer of the current content page on the screen of the electronic device, controlling a background color of the second display window based on a display tone of the current content page, to cause the background color of the second display window to match the display tone of the current content page; and adjusting a display layout of the second display window after switching to the second display window for the first display content of the current content page and the second display content of the landing page.

12. The electronic device according to claim 11, wherein performing control of the display layout to display the target display content in the second display window comprises:

performing control to display the first display content in an upper display area of the second display window;

performing control to move the second display content into the screen from the outside to fill a remaining display area below the upper display area in the second display window.

13. The electronic device according to claim 11, wherein performing control to increase the height and width of the first display window in size to switch the first display window to the second display window comprises:

performing control to move the first display content off the screen, and performing control to increase the height and width of the first display window in size after the first display window is completely moved off the screen, to switch the first display window to the second display window;

performing control to display the target display content in the second display window comprises:

performing control to display the first display content in an upper display area of the second display window, and performing control to display the second display content in the remaining display area below the upper display area in the second display window;

moving the second display window with the target display content into the screen from the outside.

14. The electronic device according to claim 11, wherein performing control to display the target display content in the second display window comprises:

controlling the first display content to split it into a plurality of display sub-contents, each display sub-content corresponding to a preset target display area in the second display window; for each display sub-content, controlling the display sub-content to move it to the corresponding target display area for display based on display position parameters corresponding to the display sub-content, determining other display content associated with the display sub-content from the second display content, and controlling the other display content to display it in the remaining display area in the target display area.

15. The electronic device according to claim 11, the operations further comprising:

in response to a display switching operation for the second display window, controlling the second display window to move it off the screen; and after the second display window is completely moved off the screen, performing control to decrease the height and width of the second display window in size to switch the second display window to the first display window;

controlling the first display content to be restored and displayed in the first display window, and controlling the second display content to hide the display of the second display content;

controlling the first display window with the first display content to move it into the screen from the outside.

* * * * *